(12) United States Patent
Rhodes et al.

(10) Patent No.: US 8,279,710 B2
(45) Date of Patent: Oct. 2, 2012

(54) UNDERWATER SYNCHRONISATION SYSTEM

(75) Inventors: Mark Rhodes, West Lothian (GB); Brendan Peter Hyland, Edinburgh (GB)

(73) Assignee: WFS Technologies Ltd., Edinburgh (GB)

(*) Notice: Subject to any disclaimer, the term of this patent is extended or adjusted under 35 U.S.C. 154(b) by 403 days.

(21) Appl. No.: 12/160,903

(22) PCT Filed: Jan. 31, 2007

(86) PCT No.: PCT/GB2007/000331
§ 371 (c)(1),
(2), (4) Date: Jun. 17, 2010

(87) PCT Pub. No.: WO2007/088360
PCT Pub. Date: Aug. 9, 2007

(65) Prior Publication Data
US 2010/0278014 A1    Nov. 4, 2010

(30) Foreign Application Priority Data
Jan. 31, 2006   (GB) .................................. 0601909.5

(51) Int. Cl.
*H04B 13/02* (2006.01)

(52) U.S. Cl. ......................................... 367/134; 367/131
(58) Field of Classification Search .................. 367/131, 367/134
See application file for complete search history.

(56) References Cited

U.S. PATENT DOCUMENTS

| | | | |
|---|---|---|---|
| 5,784,339 A | 7/1998 | Woodsum et al. | 367/134 |
| 5,894,450 A | 4/1999 | Schmidt et al. | 367/134 |
| 7,711,322 B2* | 5/2010 | Rhodes et al. | 367/131 |
| 2010/0278014 A1* | 11/2010 | Rhodes et al. | 367/131 |
| 2011/0032794 A1* | 2/2011 | Rhodes et al. | 367/134 |

FOREIGN PATENT DOCUMENTS

| | | |
|---|---|---|
| GB | 2163029 A | 2/1986 |
| GB | 2395280 A | 5/2004 |
| WO | 01/11807 A1 | 2/2001 |

* cited by examiner

*Primary Examiner* — Daniel Pihulic
(74) *Attorney, Agent, or Firm* — Paul Davis; Goodwin Procter LLP

(57) ABSTRACT

An underwater system (10) comprising a transmitter (12) for broadcasting an electromagnetic synchronization signal and at least one node (14) that has a receiver for receiving that signal, the node being adapted to use the received signal for synchronization.

13 Claims, 5 Drawing Sheets

UNDERWATER SYNCHRONISATION SYSTEM

INTRODUCTION

The present invention relates to an underwater clock reference system that uses electromagnetic propagation to allow synchronisation of clocks at several locations.

BACKGROUND

Many underwater systems comprise distributed nodes working in concert. There is often an operational need to reference all the distributed nodes to a common system clock. For example, seismic survey systems employ remotely deployed sensors distributed over several hundred meters range. Each sensor independently takes acoustic measurements. Data processing aims to identify features below the seabed based on the relative time of arrival of acoustic signals at each sensor. The quality of the survey data is therefore dependant on how accurately the system can calculate relative timings of detected acoustic events.

Currently a common sinusoidal clock reference signal is provided through direct cable connections between the sensors or synchronisation is via acoustic transmission. However, cabled systems can be very problematic in the underwater environment. They require connection into the sensor housing, which can lead to water ingress. Also, above water pre-assembly of the connections leads to an unwieldy cabled structure, which is difficult to deploy, whilst connection below the water requires wet mate radio frequency connectors that are extremely unreliable.

In an alternative arrangement, an acoustic wireless system could be used. This removes the interconnect issues. However, because sound travels through water at around 1500 m/s the propagation time between sensor locations has to be taken into account. This requires accurate knowledge of the relative position of each sensor. Accurate relative positioning introduces a secondary technological problem in the underwater environment that is difficult to resolve and limits relative timing accuracy. For example, where sensors are spaced 100 m apart there could easily be +/−1 m error in known relative position. In an acoustic system, this would result in a timing error in the order of +/−667 microseconds.

SUMMARY OF INVENTION

According to one aspect of the present invention, there is provided an underwater synchronisation system having a transmitter for transmitting an electromagnetic reference clock signal and at least one node, preferably a plurality of such nodes, that is operable to use that clock signal to synchronise its operation; wherein the antenna provided with the transmitter may be of an electrically insulated, magnetically coupled type.

Electromagnetic signals propagate through water at around 3,350,000 m/s (depending on frequency) compared to 1500 m/s for acoustic signals. Hence, by using electromagnetic transmission in many deployments the signal propagation time between nodes can be neglected. This is advantageous. In addition, use of a magnetically coupled antenna instead of electric field coupled alternatives leads to lower attenuation for both near field and far field transmission.

Each node may include a receiver for receiving the synchronisation or clock signal, which receiver preferably comprises an electrically insulated, magnetically coupled antenna. Each node is operable to use the received signal to synchronise its internal clock.

Each receiver may be operable to phase lock an internal system clock to the received signal to synchronise clock phase.

Synchronisation may occur continuously. Alternatively, synchronisation may occur only periodically in order to reduce power consumption or for other operational reasons.

Where operating in the sea, advantageously one or more of the antennas may be positioned so that the seabed is used as a transmission path.

The transmitter and each receiver all may be below water. Alternatively, at least one of the transmitter and receiver(s) may be above water and at least one below water.

BRIEF DESCRIPTION OF THE DRAWINGS

Various aspects of the invention will now be described by way of example only and with reference to the accompanying drawings, of which.

DETAILED DESCRIPTION OF THE DRAWINGS

Figure 1:
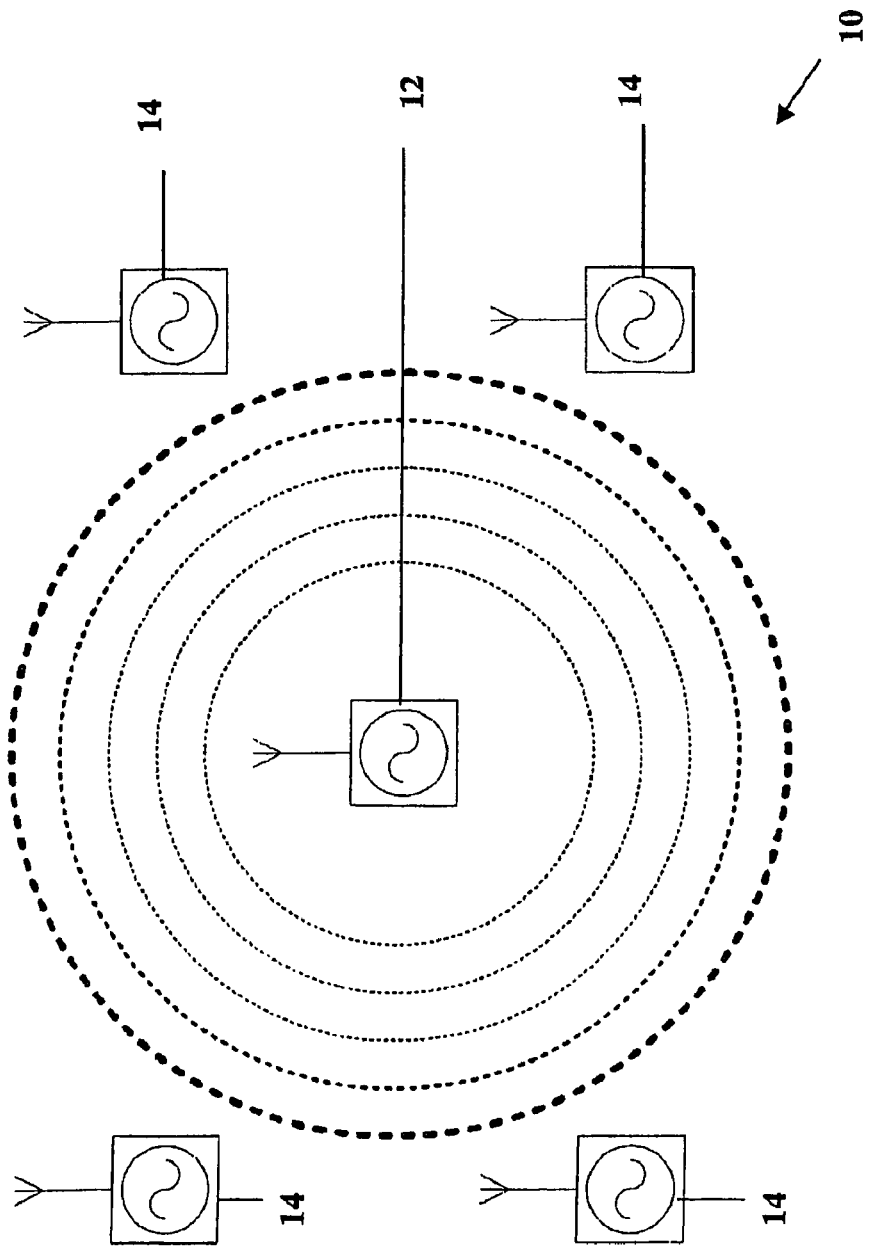
FIG. 1 is a block diagram of an underwater clock synchronisation system.

FIG. 1 shows an underwater clock synchronisation system 10 that has an electromagnetic transmitter 12 for transmitting an electromagnetic clock reference signal to each of a plurality of nodes 14, thereby to allow clocks in each node 14 to be synchronised. Each node 14 in the system may contain a receiver and transmitter, each transmitter being capable of generating and transmitting a clock reference. This allows for greater operational flexibility, and avoids single point failure since each node 14 is capable of transmitting as a reference source. Each node 14 may take its turn as reference, so that power consumption is shared. This is the most effective use of the sensor array's combined battery capacity.

Each of the nodes 12 and 14 of FIG. 1 is battery powered and has a waterproof, electrically insulated, magnetic coupled antenna combined with an electronic tuning circuit. This type of antenna is needed because water is an electrically conducting medium, and so has a significant impact on the propagation of electromagnetic signals. In practice, one or more of the nodes or the transmitter may be above the water. Because of the characteristics of electromagnetic signals, they can cross the air to water boundary, thereby enabling the comparison of timing of events detected above and below the water.

Figure 2:
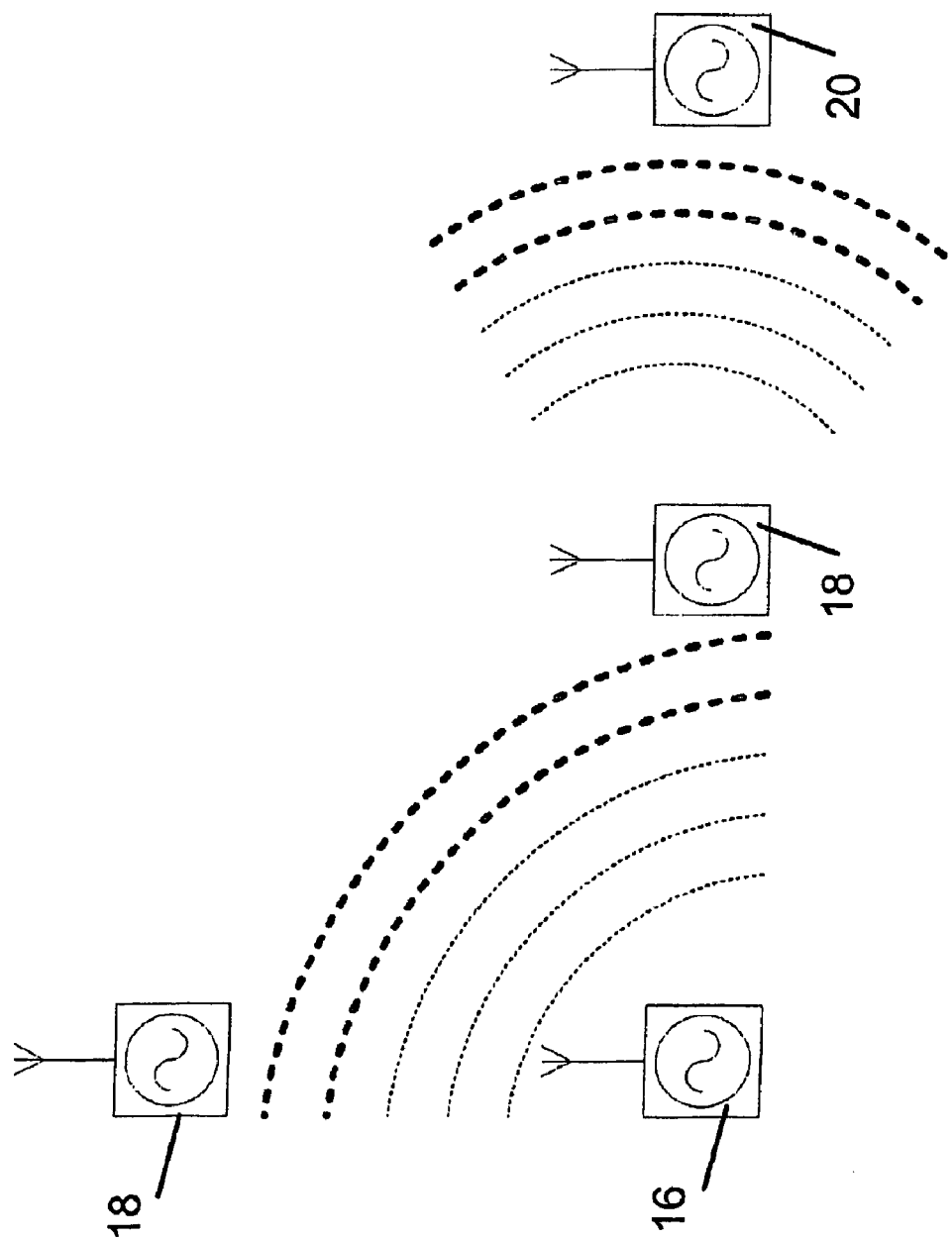
FIG. 2 is a block diagram of an underwater clock synchronisation system that uses a relay.

The system of FIG. 1 may use a relay to extend its operational range, as shown in FIG. 2. In this case, one node 16 functions as a master clock reference. Slave nodes 18 close to the operational range of the master node 16 receive synchronisation signals and use these to re-transmit a clock signal for reception at more distant nodes 20. In practice, this system would require frequency or time offset of the re-transmitted signal to prevent interference with the master.

Employing electromagnetic (EM) radiation for underwater clock systems offers significant advantages over traditional acoustic techniques such as immunity to acoustic noise and higher propagation speed. However the attenuation of EM radiation through water is significant and increases rapidly with increasing frequency. Hence, it is desirable to reduce the broadcast frequency to maximise the range of operation.

Figure 3:
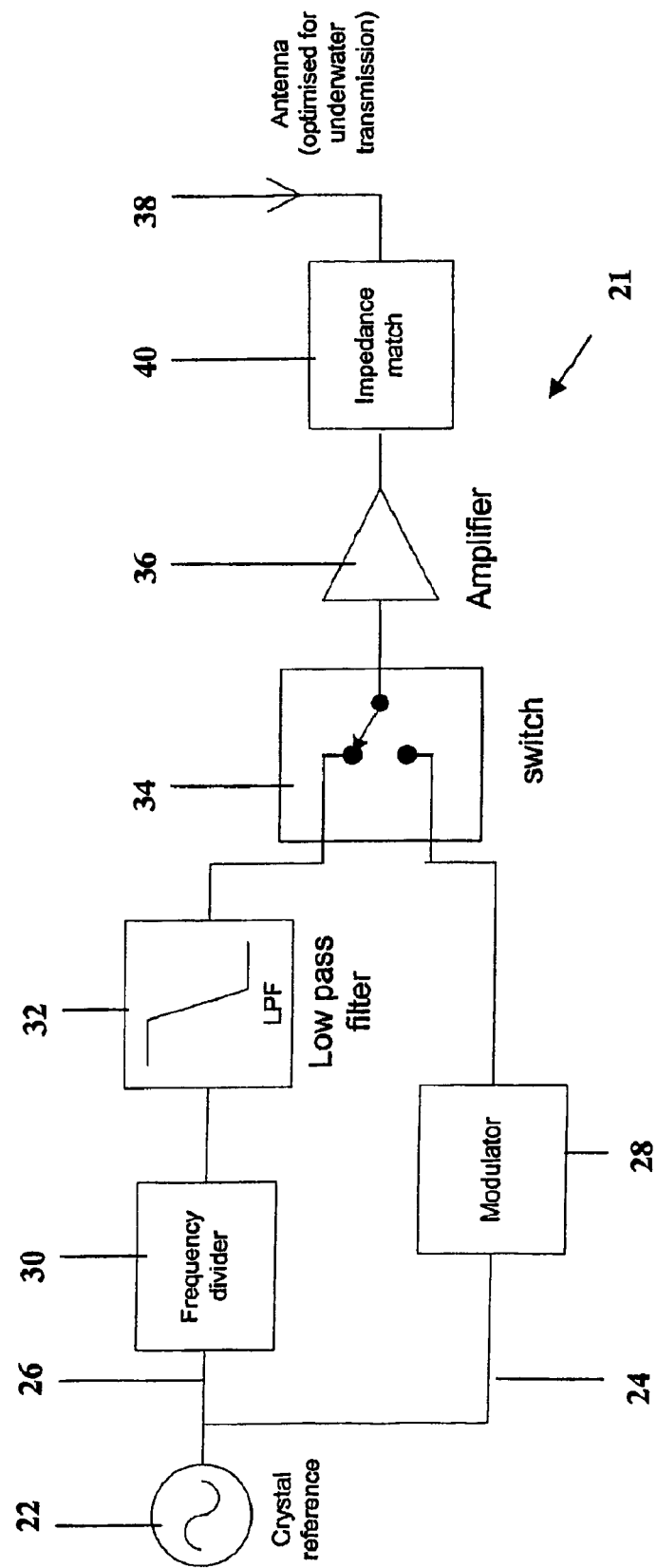
FIG. 3 is a transmitter block diagram.

FIG. 3 shows a transmitter 21 for use in the nodes of FIG. 1. This includes a clock 22, for example a crystal, for generating a clock reference signal. This provides a stable reference signal at a frequency that can support a modulated timing reference pulse, for example 1 kHz. At the output of the clock, the reference signal is split into two paths 24 and 26. One path 24 supplies a modulator 28, which generates a short reference pulse and the other path 26 supplies a divider 30 that acts to produce a lower frequency signal, for example 100 Hz, which is directly phase related to the reference signal. In use, the modulator 28 allows the transmitter 21 to periodically implement modulation of the carrier to define a baseline time reference pulse. This pulse defines a unique timing event for use in a real time clock. Low frequency continuous clock cycles provided via the divider path 26 can subsequently maintain clock synchronisation.

At the output of the frequency divider 30 is a low pass filter 32 that removes the original reference signal and limits the divided signal to a single sinusoid. This is connected at its output to the input of a two-way switch 34, which allows selection of either of the signal paths 24 and 26 from the modulator 28 or the filter 32 respectively to supply a radio frequency amplifier 36. The switch is toggled by a system controller (not shown) and can select either a constant unmodulated tone for phase locking a receiver in the distributed system via the divider path 26 or a short high frequency pulse from the modulator path 24 for definition of a reference timing event. The amplifier 36 operates over a wide enough frequency band to be operable at both the modulated frequency and the divided frequency. The signal is amplified to allow propagation over the operational range of the synchronisation system. A magnetically coupled antenna 38 optimised for underwater operation launches the transmitted signal. Connected between the amplifier 36 and the antenna 38 is an impedance matched load 40, which transforms from the amplifier output impedance to the antenna input impedance, thereby to maximise power transfer. The selection of operational frequency will be dependent on the range required in the individual deployment. For example a 100 Hz broadcast clock signal could serve over several hundred meters while a 1 kHz signal will give better timing accuracy over tens of meters.

Figure 4:
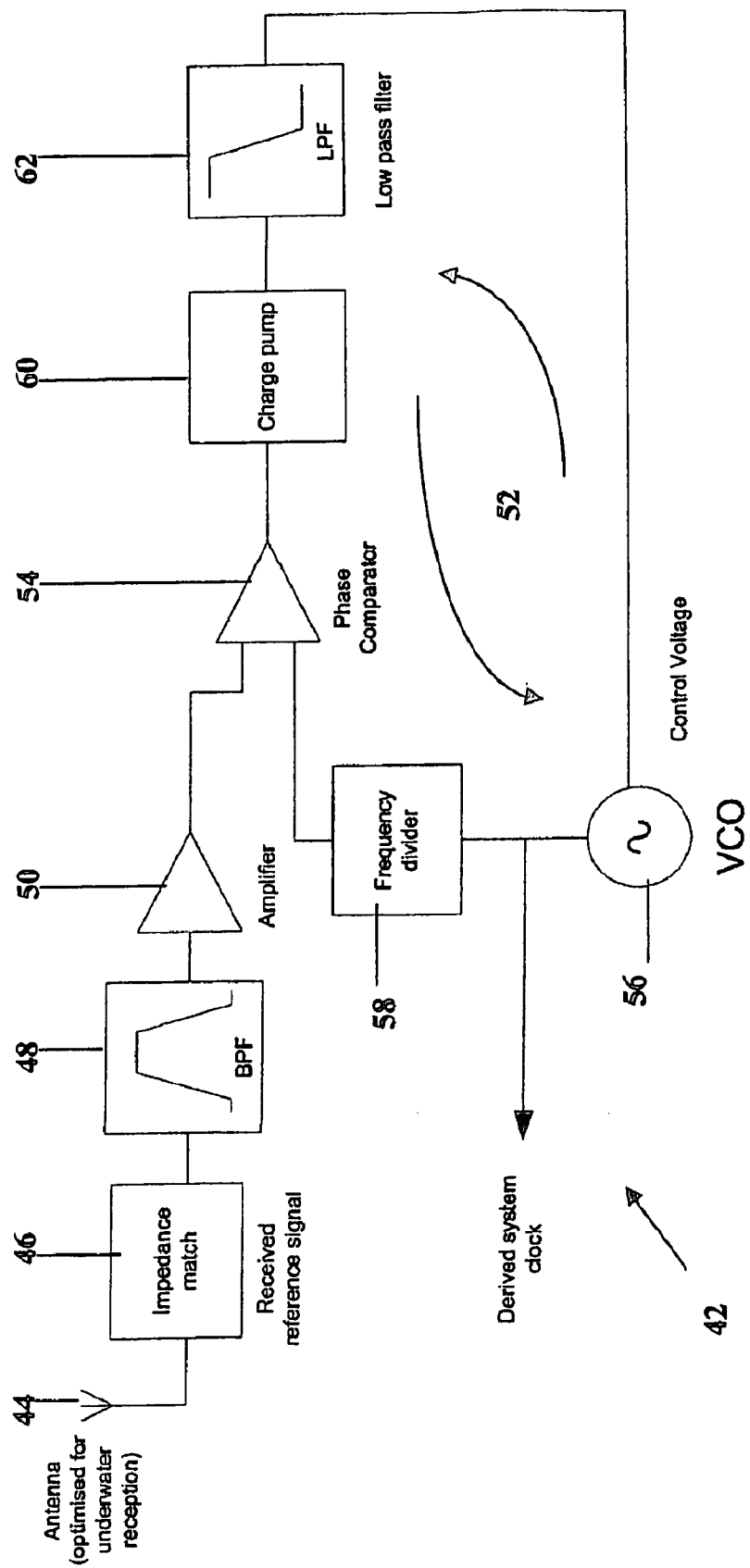
FIG. 4 is a receiver block diagram for continuous transmission system.

FIG. 4 shows a first example of a receiver 42 that can be used in the nodes of FIG. 1. In this case, the receiver 42 is adapted to continuously receive synchronisation signals from the transmitter 21. Each receiver system implements a phase locked loop in order to phase synchronise a higher frequency system clock to the broadcast reference from the transmitter. As noted previously, the receiver 42 has an electrically insulated, magnetically coupled antenna 44. This is optimised for underwater operation to maximise the received signal amplitude. The antenna output is connected to impedance load 46 that is matched to its own impedance to maximise the power delivered. The impedance-matched load 46 is connected to a band pass filter (BPF) 48, which is connected to an amplifier 50. The BPF 48 acts to improve the signal to noise ratio before broader band amplification by the low noise amplifier 50.

The amplified signal is supplied to a standard phase locked loop (PLL) 52 to allow generation of a higher frequency system clock. This includes a phase comparator 54 that produces an error voltage at its output that is proportional to the difference between the received signal and a signal from a frequency divider 58, which divides an internal clock signal that is supplied by a Voltage Controlled Oscillator (VCO) 56. The error voltage drives a charge pump circuit 60. This is low pass filtered 62 to produce a control voltage for the voltage-controlled oscillator 56. In this way the PLL 52 achieves lock when the VCO 56 reaches a frequency related to the received signal by the frequency division ratio and directly phase related. The output of the VCO 56 is then available as a derived system clock.

The broadcast sinusoidal clock signal from the divider path 24 of the transmitter allows phase locking of subsystem clocks at each node. However, a sinusoid cannot provide a time reference to compare the relative timing of events. Each node requires a real time clock reference to allow comparison of the relative timing of events at distributed locations. Hence, the precisely defined reference pulse from the modulator is required to provide a time reference point. The phase locked sinusoidal reference clock can then maintain synchronisation. Greatest timing accuracy is achieved by continuous transmission of the clock reference signal from the modulator. However, remotely deployed nodes are typically powered by self-contained power sources. Operational life is limited by power consumption. Hence, it is preferably that the clock broadcast synchronisation function operates only periodically to conserve power. The allowable interval between clock transmissions may be defined by the accuracy of the distributed clocks when left to free run and the phase drift acceptable to the system.

The accuracy with which a rising edge can be defined is related to the pulse carrier frequency. A higher frequency carrier is necessary to allow definition of a precisely timed reference pulse. For example, if comparison of event timing is required to a 1 ms resolution, the resolution of a pulse rising edge is required to be at least 1 ms, which would require a carrier above 1 kHz. However, higher frequencies lead to higher attenuation so pulse transmission over the distance achieved by the lower frequency phase lock reference will require higher transmit power. For this reason the timing reference pulse from the modulator path 26 will be transmitted very infrequently as required by clock timing drift.

Figure 5:
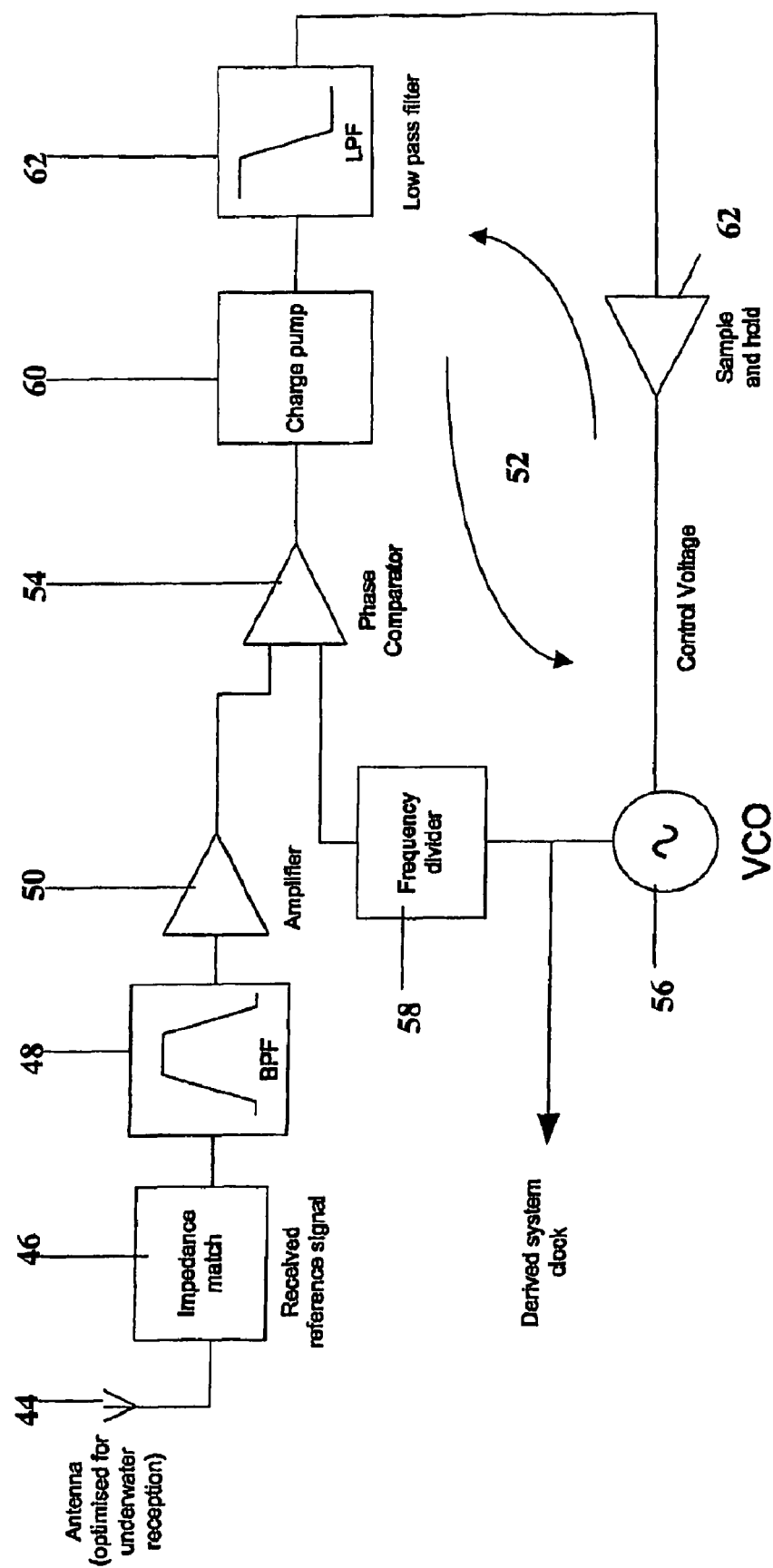
FIG. 5 is a receiver block diagram for a periodic lock transmission system.

FIG. 5 shows another example of a receiver that is adapted to periodically receive signals from the transmitter. This is similar to the arrangement of FIG. 3, except in this case a sample and hold amplifier 62 is provided between the low pass filter and the voltage supply. When there is no received reference signal present, the sample and hold circuit acts to hold the VCO control voltage to maintain its output frequency.

This allows a system clock reference to carry over between synchronisation transmissions. Periodic transmission of the reference signal reduces power consumption so extending operational life.

In order to improve range in sea, the transmitting and receiving antennas may be buried or in close proximity to the seabed, so that the radiation is directed into the seabed. This is advantageous because the seabed represents a lower loss transmission medium, compared to seawater, due to its lower conductivity. The low loss properties of the seabed, lake bed or bed of other watercourse, often offer a reduced attenuation path allowing longer-range operation. These low loss properties arise from the non-conductive nature of the sand, stone and other particles that typically form the bed of bodies of water. Hence, by directing radiation into the seabed, it can act as a lower loss transmission path for the radiation compared to the direct path through water.

The present invention provides numerous advantages. Because electromagnetic signals propagate through water at around 3,350,000 m/s compared to 1500 m/s for acoustic signals, by using an electromagnetic clock, propagation time between nodes can be neglected. Another advantage of an electromagnetic clock is the ability of the signal to effectively cross the water to air boundary. This enables comparison of the timing of events detected above and below the water. Yet another advantage is that it can operate continuously whilst acoustic measurements are being made. In contrast, an acoustic clock reference would interfere with acoustic monitoring at harmonics of the clock frequency. Yet another advantage is that the system is equally applicable in fresh or salt water, although higher attenuation in salt water would reduce operational range.

A skilled person will appreciate that variations of the disclosed arrangements are possible without departing from the invention. Alternative configurations are clearly possible. For example, a variety of antenna types may be used but a magnetically coupled, electrically insulated antenna is generally convenient and preferable. Accordingly the above description of the specific embodiment is made by way of example only and not for the purposes of limitation. It will be clear to the skilled person that minor modifications may be made without significant changes to the operation described.

The invention claimed is:

1. An underwater system comprising a transmitter, the transmitter including a clock and transmitting an electromagnetic clock reference synchronisation signal, and at least one node in close proximity to the seabed, the node including a receiver for receiving the signal, the node being adapted to use the received signal for clock synchronisation.

2. An underwater system as claimed in claim 1 wherein the transmitter has an electrically insulated, magnetically coupled antenna for broadcasting the electromagnetic synchronisation signal.

3. An underwater system as claimed in claim 1 or claim 2 wherein the receiver has an electrically insulated magnetically coupled antenna.

4. An underwater system as claimed in claim 1 wherein the transmitter is operable to transmit a synchronisation signal that is indicative of an absolute timing event.

5. An underwater system as claimed in claim 1 wherein the transmitter is operable to transmit a synchronisation signal that is indicative of relative timing.

6. An underwater system as claimed in claim 5 wherein the synchronisation signal is a time varying signal, such as a sinusoidal signal.

7. An underwater system as claimed in claim 6 wherein a receiver is operable to phase lock the received synchronisation signal to an internal system clock to synchronise clock phase.

8. An underwater system as claimed in claim 1 wherein synchronisation occurs substantially continuously.

9. An underwater system as claimed in claim 1 wherein synchronisation occurs periodically.

10. An underwater system as claimed in claim 1 wherein the antennas use the seabed as a transmission path.

11. An underwater system as claimed in claim 1 wherein at least one of the transmitter and receiver(s) is above water and at least one is below water.

12. An underwater system as claimed in claim 1 wherein at least one receiver is operable to re-transmit the synchronisation signal to another more remote receiver.

13. A receiver for use in an underwater system comprising a transmitter, the transmitter including a clock and transmitting an electromagnetic clock reference synchronisation signal, and at least one node in close proximity to the seabed, the node including a receiver for receiving the signal, the node being adapted to use the received signal for clock synchronisation.

* * * * *